United States Patent [19]

Itaya et al.

[11] Patent Number: 4,791,694
[45] Date of Patent: Dec. 20, 1988

[54] CLEANING AND WAXING TOOL FOR AUTOMOBILES, VANS, ETC.

[75] Inventors: Sam S. Itaya, Pasadena; Robert E. Burglin, Orange, both of Calif.

[73] Assignee: Waxing Corporation of America, Inc., Orange, Calif.

[21] Appl. No.: 53,960

[22] Filed: May 22, 1987

[51] Int. Cl.⁴ .................. B60S 3/06; A46B 13/00
[52] U.S. Cl. ...................... 15/97 R; 51/170 MT
[58] Field of Search ............... 15/22 R, 28, 29, 97 R, 15/49 R; 310/50; 51/170 T, 170 TL, 170 MT; 173/170

[56] References Cited

U.S. PATENT DOCUMENTS

| D. 202,694 | 11/1965 | Rosenberg | D9/2 |
|---|---|---|---|
| D. 254,231 | 2/1980 | Burglin et al. | D8/62 |
| D. 264,797 | 6/1982 | Burglin et al. | D8/62 |
| 1,521,620 | 1/1925 | Hadaway . | |
| 1,609,508 | 12/1926 | Caricchi . | |
| 1,648,663 | 11/1927 | Stratford . | |
| 2,034,445 | 3/1936 | Baird | 15/98 |
| 2,395,537 | 2/1946 | Crosby | 51/170 |
| 2,547,057 | 4/1951 | Stieglitz | 51/170 |
| 2,597,971 | 5/1952 | Burnham | 15/97 |
| 2,904,805 | 9/1959 | Dardig | 15/97 R |
| 2,917,979 | 12/1959 | Dening et al. | 94/45 |
| 2,942,384 | 6/1960 | Higley | 51/170 |
| 2,967,315 | 1/1961 | Heleig et al. | 15/49 |
| 3,084,364 | 4/1963 | Hutchins | 15/97 |
| 3,251,087 | 5/1966 | Platt, Jr. | 15/98 |
| 3,336,703 | 8/1967 | Multer | 51/170 |
| 3,416,177 | 12/1968 | Young | 15/98 |
| 3,445,877 | 5/1969 | Stout | 15/98 |
| 3,448,476 | 6/1969 | Zaccone | 15/97 |
| 3,520,090 | 7/1970 | Lee | 51/170 |
| 3,531,812 | 10/1970 | Bailey et al. | 15/97 |
| 3,793,776 | 2/1974 | Sadow, Jr. et al. | 51/170 |
| 3,849,943 | 11/1974 | Thomas et al. | 51/170 |
| 4,188,682 | 2/1980 | Burglin et al. | 15/97 |

FOREIGN PATENT DOCUMENTS 455803  4/1949  Canada .

OTHER PUBLICATIONS

Hollywood Accessories "New Products" Brochure, p. 1, Orbitron 110 Volt Auto Polisher, ©1983.
Wen Products, Inc., Owner's Manual for Model 10 Orbital Car Waxer, (Feb. 1985).
Two drawing sheets of weight described in Applicant's U.S. Pat. No. 4,188,682.

Primary Examiner—Edward L. Roberts
Attorney, Agent, or Firm—Richard L. Gausewitz

[57] ABSTRACT

A hand-held orbital automobile polisher of the type having a housing with handle means close-coupled to it so that the operator grasps the polisher very near the housing, and moves the polisher to different regions of the automobile. An electric motor is mounted in the housing, and a counterweight is mounted on the motor shaft. A pad assembly is connected to the counterweight at a point offset from the shaft, the axis of rotation of the pad assembly relative to the counterweight being substantially parallel to the shaft axis. The overall weight of the polisher is in the range of about four pounds to about eight pounds. The rotational speed of the motor, and the constructions and masses and mounting points of the counterweight and the pad assembly, are such that the net centrifugal force generated by the counterweight and the pad assembly is in the range of ten to eighteen pounds.

33 Claims, 2 Drawing Sheets

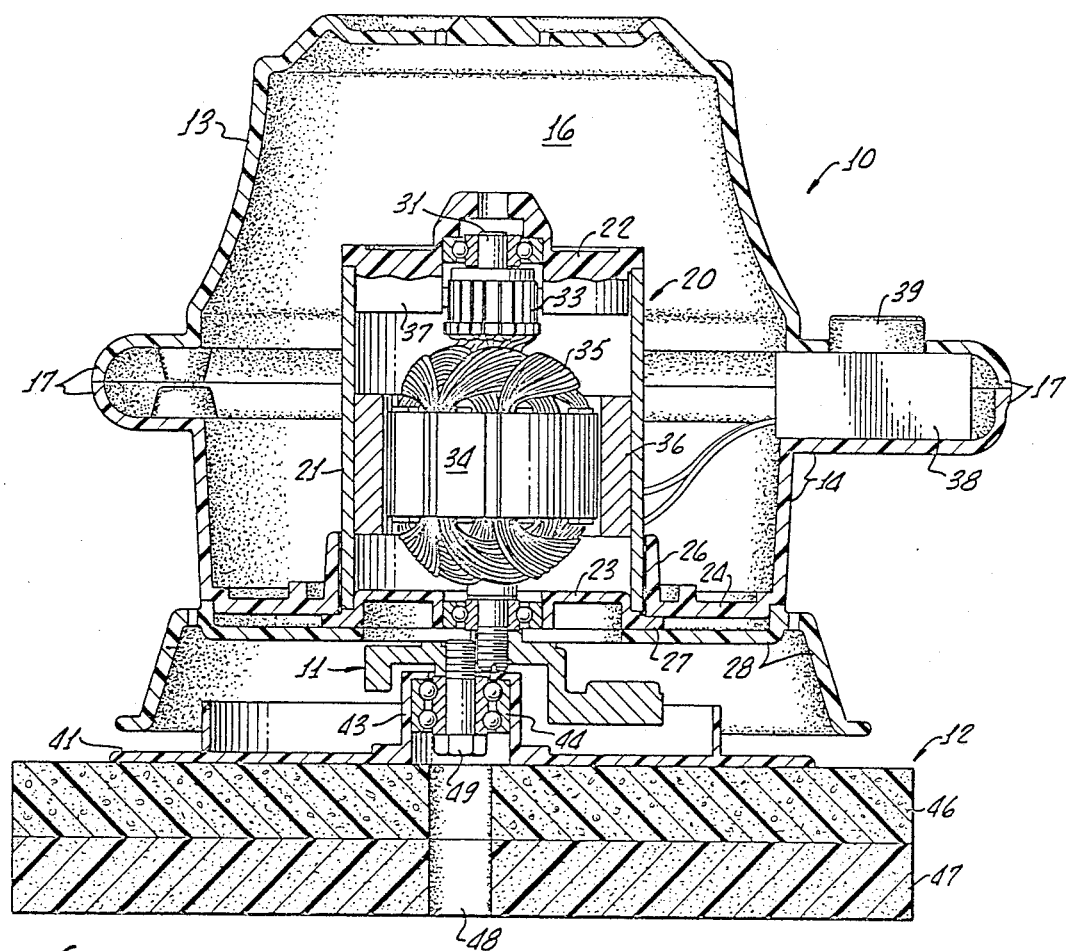
FIG. 2.
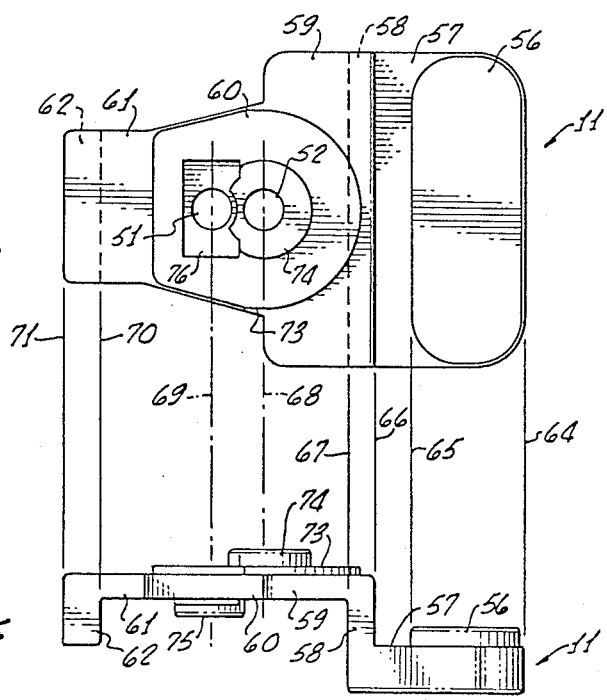
FIG. 3a.
FIG. 3b.

CLEANING AND WAXING TOOL FOR AUTOMOBILES, VANS, ETC.

BACKGROUND OF THE INVENTION

The present cleaning and waxing tool is a hand-held apparatus adapted to be employed as part of a system for cleaning, waxing and/or polishing automobiles, vans, motor homes, boats, airplanes, etc. For purposes of convenience, the tool will be referred to as a hand-held orbital automobile polisher.

Hand-held orbital automobile polishers have long been manufactured by applicants and others, reference being made to applicants' U.S. Pat. No. 4,188,682. Applicants' polishers now on the market have a one-pound counterweight, and are relatively high-powered and heavy. It is a purpose of the present invention to provide a hand-held orbital polisher that is relatively small and light in weight, has less power, and has a much smaller counterweight, yet will do a highly satisfactory job of polishing automobiles, etc. Another objective of the invention is to achieve smoothness and efficiency of polishing action, while avoiding any tendency to grab, bounce or stall, in a polisher that is so small and light that it may be purchased for relatively low price and then used for long periods of time without substantial difficulty or strain, even by individuals who are not strong.

Much experimentation has gone into the creation of the counterweight that—in combination with the motor—is the heart of the present polisher. This has resulted in a counterweight weighing only a little over one-third pound, and capable of economical mass production, yet which works so well in combination with the motor, housing and pad that the orbital polishing action of the apparatus is highly smooth and satisfactory. In the polisher greatly preferred by applicants, no gearing is employed, there being a direct drive from a D.C. motor to the polishing pad.

SUMMARY OF THE INVENTION

The present hand-held orbital automobile polisher has an overall weight in the range of about four pounds to about eight pounds, and a pad diameter in the range of about seven inches to about ten inches. The axis of rotation of the motor is perpendicular to the pad. The pad is rotatably mounted for rotation about an axis parallel to and spaced only a small distance from the motor axis. Such spacing of the axes from each other is in the range of about $\frac{1}{8}$ inch to about $\frac{1}{2}$ inch. The motor has such power as to rotate at a speed of about 2,400 rpm when both the preferred counterweight and the preferred pad are connected thereto.

The counterweight is of particular importance to the combination, because it operates in conjunction with the above-indicated factors to achieve the stated smoothness, efficiency and effectiveness of operation of the orbital polisher. For the preferred polisher, having an overall weight of 5 pounds 2 ounces, a pad diameter of about 9 inches, an axis-to-axis spacing of 0.337 inch, and the stated rotational speed of 2,400 rpm, the counterweight is constructed to create a centrifugal force of about 39 pounds. This is partially offset by centrifugal force, created by the preferred pad assembly, of about 25 pounds. The net centrifugal force is about 14 pounds. This net centrifugal force pulls the pad back and forth in orbital fashion, and creates the desired polishing effects. Less preferably, the net force may be varied so as to be up to four pounds higher or lower than the stated 14-pound value.

The counterweight is close coupled to the motor and pad, and has seven portions. Each counterweight portion has a predetermined position relative to the axis of the motor, and in the preferred form some such portions are in different radial planes than others. Each counterweight portion has a predetermined weight, location, and plane, as set forth in the following description.

BRIEF DESCRIPTION OF DRAWINGS

FIG. 2 is a vertical central section of the orbital polishing apparatus, some parts (such as the rotor of the motor) being shown in elevation instead of section;

FIG. 3a is a top plan view of the counterweight, and indicating imaginary "planes" that "divide" the counterweight into the seven portions or sections referred to above; and FIG. 3b is a side elevational view of the counterweight and related to FIG. 3a so as to better illustrate the relationship between the imaginary planes and the counterweight portions.

DETAILED DESCRIPTION OF THE PREFERRED EMBODIMENT

Figure 1:
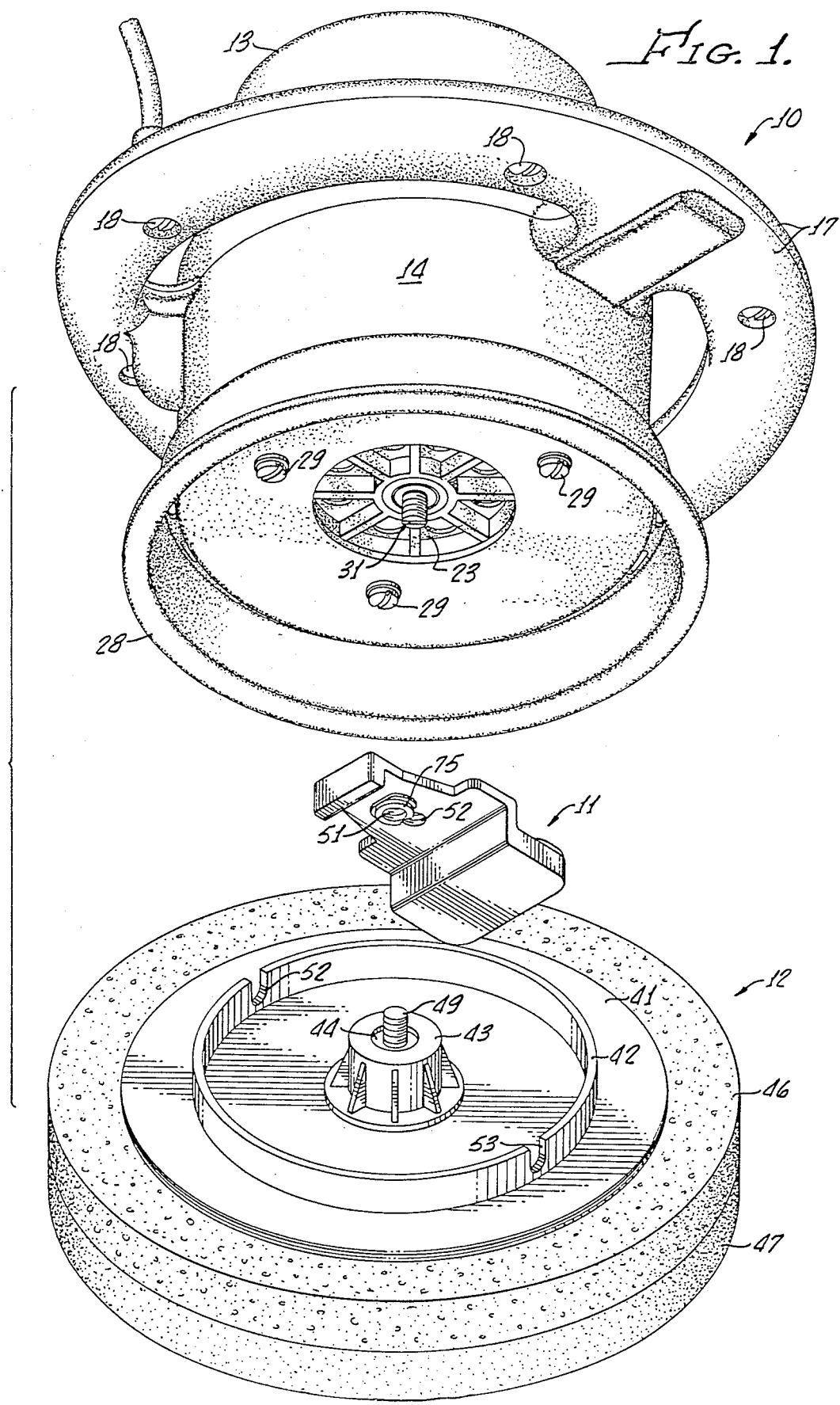
FIG. 1 is an exploded isometric view showing the counterweight as related to the motor and housing thereabove and the pad assembly therebelow.

Referring first to FIG. 1, the hand-held orbital polisher is illustrated to comprise a housing and motor assembly 10, a precision counterweight 11, and a pad assembly 12. In the preferred form, the three elements 10–12 are associated with each other by threading the counterweight 11 onto the motor shaft of assembly 10, and by bolting the pad assembly to the counterweight, as described subsequently.

Referring to FIG. 2, the housing and motor assembly 10 comprises upper and lower shell sections 13 and 14, respectively, molded of synthetic resin. The shell sections 13, 14 define a chamber 16 for the motor and other electrical components, and also form a handle 17 best shown in FIG. 1. The shell sections are secured together by screws 18 that extend upwardly through the lower portion of the handle as illustrated in FIG. 1. The handle 17 is close-coupled to the main body of the housing.

A motor 20, very preferably a D.C. motor, is mounted in chamber 16 coaxially of shell sections 13,14. The motor comprises a tubular housing 21 formed of metal and having end closures 22, 23 secured at the upper and lower ends of housing 21 as by longitudinal bolts, not shown. The end closures 22, 23 are preferably formed as synthetic resin and have openings therein for cooling of the motor.

Mounting of the motor is effected by causing it to be cantilevered upwardly from the bottom wall 24 of lower shell 14, the housing 21 extending through an upwardly-projecting annular flange 26 that is formed integrally with wall 24 around a large opening in such wall. The lower end closure 23 has horizontal flanges 27 that extend outwardly and are nested between wall 24 and a skirt element 28. Thus, the skirt 28 aids in mounting the motor 20 and also shields the counterweight 11 so as to prevent touching thereof. Assembly of skirt 28 to the bottom wall 24 is effected by screws 29 shown in FIG. 1. Such screws extend into flanges 27 to aid in mounting of motor 20.

The motor 20 has a shaft 31 mounted in ball bearings that are seated in the end closures 22, 23. Mounted on the shaft 31 are the commutator 33 and core 34 of the motor, the core having the motor windings 35 wound therein and therearound. Permanent magnet means 36 are fixedly secured in housing 21 around the core 34, and brushes 37 are mounted adjacent the commutator with their moving elements in contact with such commutator.

D.C. electric power is fed to the motor 20 from a conventional 110-volt 60-Hz. Source via a combination switch and rectifier assembly indicated at 38. Assembly 38, and the push button 39 of the switch, are mounted in and on the handle 17. The operator maintains the button 39 depressed at all times when it is desired that polishing occur.

Proceeding next to a description of pad assembly 12, this comprises a generally disc-shaped pad base 41 that is light in weight and preferably formed of synthetic resin. Base 41 has an upwardly-extending flange 42 (FIG. 1) that further shields counterweight 11. The base also has, at the central portion thereof around a central opening therein, an upwardly-extending socket portion 43 containing a double ball bearing 44.

Pad base 41 is adhesively secured to an upper pad portion 46 which, in turn, is adhesively secured to a lower pad portion 47. Both of the portions 46, 47 are light in weight and formed of expanded or blown synthetic resin. Upper portion 46 is only slightly flexible, being preferably styrofoam, while lower portion 47 is much more flexible and preferably a urethane. A suitable fluid-impervious layer, not shown, is preferably coated onto the under surface of portion 47.

The peripheral regions of the pad portions 46, 47 extend radially-outwardly from skirt 28. The centers of such portions are provided with a central opening or passage 48 to permit access to the head of an upwardly-extending bolt 49 that extends through ball bearing 44. In the preferred form, bolt 49 has a left-hand thread and is threaded into a correspondingly-threaded opening 51 in counterweight 11. A second opening 52 in the counterweight is threaded onto the lower end of motor shaft 31, such lower end being provided with a right-hand thread and the opening 52 being correspondingly threaded.

To assemble the elements 10-12 to each other, a screwdriver is used to hold the motor shaft 31 against rotation (a suitable groove being provided in the lower shaft end for that purpose), and the counterweight 11 is threaded thereon at opening 52. Then, a screwdriver is inserted below skirt 28 and above pad base 41, through a notch 53 in flange 42 shown in FIG. 1, and used to prevent the counterweight 11 from rotating. Bolt 49 is then introduced upwardly through opening 48, and through bearing 41, and threaded into the counterweight 11 at its opening 51.

It is pointed out that there is a close-coupled relationship between the motor 20 and pad assembly 12. Thus, for example, the portion of shaft 31 that extends below the lower bearing for such shaft is short, as is bolt 49.

The Precision Counterweight

As best shown in FIGS. 1, 3a and 3b, counterweight 11 is symmetrical about a reference plane containing the axis of shaft 31 and the axis of bolt 49.

Referring particularly to FIGS. 3a and 3b, the counterweight consists of seven portions or sections 56-62 that lie between planes which are (a) parallel to each other, and (b) perpendicular to the above-specified reference plane containing the axes of shaft 31 and bolt 49. The planes are numbered 64-71 in FIGS. 3a and 3b. The first portion, number 56, lies between planes 64 and 65 and is generally rectangular, having its major axis perpendicular to the reference plane containing the shaft axes. Such portion 56 is quite thick, and its lower surface is relatively close to pad base 41. The upper surface of portion 56 is parallel to the lower surface thereof. The second portion, number 57, lies between planes 65 and 66. Its lower surface is coplanar with the lower surface of portion 56, but its upper surface is somewhat lower than all but the adjacent corner regions of portion 56. The third portion of the counterweight, numbered 58, lies between planes 66 and 67. It extends upwardly from the inner edge of portion 57 to a region substantially above the upper surface of portion 56.

Referring next to the fourth portion or section 59 of the counterweight, it lies between planes 67 and 68, the latter plane containing the axis of opening 52 and thus of shaft 31. Portion 59 has parallel upper and lower surfaces, the upper surface being relatively close to the lower bearing for shaft 31.

It is pointed out that, when viewed from above as in FIG. 3a, the counterweight portions 56-59 appear to form a single rectangle extending between planes 64 and 68. The fifth counterweight portion 60, on the other hand, lies between planes 68 and 69, and is trapezoidal when viewed from above as in FIG. 3a. The base of the trapezoid is in the plane 68 containing the axis of shaft 31, while the opposed side of the trapezoid is in plane 69 which contains the axis of opening 51 and thus of bolt 49. The trapezoid base is much smaller in dimension than is the side of counterweight portion 59 at plane 68, so that there are substantial indentations in the counterweight outwardly of such trapezoid base.

The sixth portion of the counterweight is numbered 61, and lies between planes 69 and 70. Such sixth portion has a lower surface coplanar with the lower surface of portions 59 and 60. One part of sixth portion 61, to the right as viewed in FIGS. 3a and 3b, is trapezoidal when viewed from above and forms a continuation of the trapezoidal fifth portion 60. The other (left) part of portion 61 is rectangular as shown in FIG. 3a, the major axis of the rectangle extending perpendicular to the reference plane containing the shaft axes.

The seventh portion of the counterweight, lying between planes 70 and 71, may be termed the tail in that it has a portion which extends downwardly to a lower end surface that is at generally the same level as the upper region of first portion 56. When viewed from above in FIG. 3a, portion 62 and the other (left) part of portion 61 appear to be a single rectangle.

The upper region of fifth portion 60 and the adjacent region of sixth portion 61 are somewhat elevated to form part of a large boss indicated a 73 in FIGS. 3a and 3b. The remainder of such large boss 73 overlies regions of the third and fourth portions 58 and 59, respectively, and is semicircular as shown in FIG. 3a.

A small boss 74 extends upwardly from the upper surface of large boss 73, and encompasses the threaded opening 52 for shaft 31. The upper surface of boss 74 seats on the inner race of the lower bearing for shaft 31 when the apparatus is assembled as shown in FIG. 2. A second small boss, numbered 75, extends downwardly from regions of counterweight portions 60 and 61, and encompasses the opening 51 for bolt 49. The lower surface of boss 75 seats on the inner race of bearing 44 when the apparatus is in the assembled condition of FIG. 2.

A shallow depression, numbered 76 in FIG. 3a and being generally rectangular in shape, has a bottom wall that is substantially coplanar with the upper surface of portion 62 and the adjacent part of portion 61. Depression 76 is centered, as shown in FIG. 3a, at the axis of opening 51.

It is pointed out that the opening 51, 52 are, in the preferred form, very close to each other, not far from being tangential to each other.

The counterweight 11 is, in the preferred form, die cast of zinc. Its various portions or sections have weights and positions stated below.

Description of Certain Critical Relationships

The overall weight of the hand-held orbital automobile polisher of the present invention is in the range of about four pounds to about eight pounds, preferably relatively close to five pounds. The weight of the preferred embodiment is five pounds two ounces. This weight range minimizes operator fatigue, while, at the same time, providing a base having sufficient mass that it does not tend to move around substantially in the operator's hands as a result of the orbital action.

The diameter of pad elements 46, 47 is in the range of about seven to about ten inches, and is preferably about nine inches. The weight of the preferred pad assembly 12 (including elements 46, 47, 41-44 and 49) is, for the preferred pad diameter of about nine inches, about ½ pound, namely 0.46 pound. It is to be understood that a bonnet, preferably a light weight terry cloth bonnet, is mounted around the pad elements 46, 47 and holds the waxing, polishing and cleaning substances. Such bonnet preferably weighs about one ounce, and its weight is not taken into account in the present description.

The D.C. motor 20 has the great advantage of being substantially impossible to stall under normal operating conditions. It is preferably so powered as to rotate shaft 31 at 2,400 rpm provided the preferred pad and counterweight are present, and the pad is not being pressed against a surface.

The distance between the axis of shaft 31 and that of bolt 49 is important, and such distance is kept small. The range of the spacing between the shaft axes is about ⅛ inch to about ½ inch. The preferred distance between such axes is 0.337 inch.

The counterweight 11 and pad assembly 12 cooperate with each other to generate an unbalanced rotating mass producing a predetermined centrifugal force. Such force is directed toward the axis of motor shaft 31. The force causes the pad assembly 12 to move back and forth at a predetermined number of orbits or strokes per minute, such number corresponding to the speed of rotation of shaft 31.

The amplitude of movement of the pad is equal to twice the distance between the shaft axes minus twice the distance that the housing and motor assembly 10 moves, it being assumed that the assembly 10 is not clamped in a vise but instead is loosely held by an operator as is normally the case. In the preferred form, the housing and motor assembly 10 moves about 1/25 inch in each direction while the pad assembly 11 moves about ⅛ inch in the opposite direction, thus resulting in a net movement in the pad assembly (in each direction) of about 0.29 inch. Since the pad assembly moves back and forth, the total or overall amplitude of pad movement is approximately 0.58 inch.

The amount of the centrifugal force is a function of the masses of the elements, the off-center distances of the counterweight portions and of the pad assembly 12, and the number of revolutions per minute of motor shaft 31. The force for each off-center component is determined by the equation:

$$F = mR\left(\frac{N2\pi}{60}\right)^2$$

where:
  m equals the weight in pounds of each component, divided by 32.2 feet per second per second to produce the mass in slugs.
  R equals the feet from the motor axis to the center of gravity of the particular component.
  F equals pounds of centrifugal force.
  N equals the number of revolutions per minute of motor shaft 31 when the counterweight 11 and pad assembly 12 are in mounted condition.

It will be assumed, in this part of the specification, that the entire counterweight 11 is in the same radial plane perpendicular to and close coupled to the motor shaft 31. It will also be assumed that the overall weight of the apparatus is the preferred weight stated above, namely 5.12 pounds, and that pad assembly 12 is the preferred weight stated above, namely 0.46 pound. It will also be assumed that the motor shaft 31 with the counterweight and pad assembly connected thereto is being operated at 2,400 rpm. In addition, it will be assumed that the spacing between the axis of the motor and that of bolt 49 is the preferred one stated above, namely 0.337 inch.

The accordance with one aspect of the invention, the counterweight 11 is so constructed, for the preferred form set forth in the preceding paragraph, as to generate a centrifugal force of about 39 pounds. The pad assembly 12, in the stated preferred form, generates a centrifugal force of about 25 pounds, so that the net centrifugal force is about 14 pounds.

Some portions of the counterweight 11 are much closer to the pad than are other portions of the counterweight. This creates a dynamic unbalance and provides additional forces, such forces being in the nature of torques in the plane of FIG. 2 (both shaft axes being in such plane in FIG. 2; it being understood, however, that this plane rotates as the bolt 49 rotates around the shaft 31). The additional forces generated by this dynamic action cooperate with the above-specified centrifugal force in generating the desired polishing action.

Using the above-stated equation, there will now be specified the approximate centrifugal force, about the axis of shaft 31, resulting from each of the seven portions 56-62 of the counterweight 11. The specified weight and distance relationships are those preferred for the above-specified preferred weight range of the apparatus, preferred weight of pad assembly 12, preferred axis-to-axis spacing, and preferred number of revolutions per minute, all stated above.

Portions 56 (the first portion) of the counterweight weighs about 0.1377 pound, and its center of mass is about 0.1125 foot from the axis of shaft 31. The resulting force factor generated by portion 56 is 30.39 pounds.

Portion 57 (the second portion) weighs about 0.0614 pound; its center of mass is about 0.0733 foot from the axis of shaft 52. Using the above-stated equation, the force generated by this portion 57 is 8.83 pounds.

Portion 58 (the third portion) weighs about 0.0566 pound. The center of mas of this portion is about 0.0533 foot from the axis of the motor, and the resulting force is 5.92 pounds.

Portion 59 (the fourth portion weighs about 0.0395 pound. Since this portion has a center of mass approximately 0.0233 foot from the axis of the motor, the resulting force is 1.807 pounds.

Referring next to portion 60, the fifth portion, this weighs 0.0154 pound, and its center of mass is approximately 0.01417 foot from the motor axis, so that the resulting force is 0.428 pound.

Portion 61 (the sixth portion) weighs about 0.0250 pound. This portion has a center of mass spaced approximately 0.0592 foot from the motor shaft axis. Accordingly, the resulting force is 2.9 pounds.

The tail portion 62 (seventh portion) of the counterweight weighs about 0.0245 pound, and its center of mass is about 0.0983 foot from the motor shaft axis. Accordingly, the force generated by this portion is 4.724 pound.

Subtracting the centrifugal forces generated on one side of the axis of shaft 31 (namely, one side of plane 68 in FIGS. 3a and 3b) from those generated on the other side of such axis and plane, the net centrifugal force about the axis of the motor, created by counterweight 11, is about 39 pounds.

Referring now to the preferred pad assembly 12, it weighs about 0.46 pound, and its axis is about 0.02808 foot from the motor axis. The centrifugal force created by the pad assembly is thus about 25 pounds. This being on the opposite side of the motor shaft axis (and plane 68) from the above-stated net centrifugal force created by the counterweight, it is subtracted from the latter to produce an overall net centrifugal force of about 14 pounds. Less preferably, the various factors may be varied so as to increase such overall centrifugal force to up to 18 pounds or reduce it to as low as 10 pounds. Similarly, the centrifugal force created by the counterweight alone, without reference to the pad assembly, may—less preferably—be varied between about 35 and about 43 pounds.

The described preferred counterweight is surprisingly small, and is capable of being economically die cast of zinc. It weighs only 0.36 pound (a little over five ounces), yet generates a highly satisfactory orbital polishing action of the pad assembly 12.

The smoothness and satisfactoriness of operation of the tool is augmented because portions of the counterweight 11 are relatively close to the pad assembly in comparison to those counterweight portions to which the shaft 31 and bolt 49 connect. Thus, the heaviest counterweight portions, namely portions 56 and 57, are relatively close to the pad base 41. Also, the tail portion 62 extends downardly until its lower surface is about the same distance from the pad base as is the upper region of portion 56. Dynamic unbalance forces are thus generated to augment the above-stated desired effects.

For the described preferred counterweight, formed of zinc, the sizes are substantially as follows. The distance from the left end of the counterweight (FIG. 3a) to the right end thereof: 3 inches. The distance between opposite ends of each portion 56–59 is 2 inches; that is to say, the maximum distance of each such portion from the reference plane containing the axes of shaft 31 and bolt 49 is 1 inch. The length of portion 62 (perpendicular to the specified reference plane) is about 1 inch. The length of the base of the trapezoid where portion 60 joins portion 59, is 1⅛ inches.

The vertical dimension of tail 62, as viewed in FIG. 3b, is 7/16 inch, while the horizontal dimension of such tail is 3/16 inch. The horizontal dimension of portions 56 and 57 combined (it being understood that all of the stated "horizontal dimensions" are in a direction parallel to the reference plane containing the axes of shaft 31 and bolt 49) is slightly under 1 inch. The vertical dimension of portion 56 is ⅛ inch, while that of portion 57 is slightly over ¼ inch. The upper surface of counterweight portion 56 is approximately ⅛ inch below the upper surface of large boss 73. The lower surface of portion 56 is about ¾ inch below the upper surface of large boss 73.

The foregoing detailed description is to be clearly understood as given by way of illustration and example only, the spirit and scope of this invention being limited solely by the appended claims.

What is claimed is:

1. A hand-held orbital automobile polisher, which comprises:

a housing having handle means close-coupled thereto whereby the operator grasps the polisher closely adjacent the housing, and moves the polisher to the desired regions of the automobile or other object to be polished, an electric motor mounted in said housing, a counterweight mounted on the shaft of said motor, and a pad assembly rotatably connected to said counterweight at a point offset from said motor shaft, the axis of rotation of said pad assembly relative to said counterweight being substantially parallel to the axis of said motor shaft, characterized in that the overall weight of said polisher is in the range of about four pounds to about eight pounds, and further characterized in that the rotational speed of said motor, and the constructions and masses and mounting points of said counterweight and said pad assembly, are such that the net centrifugal force generated by said counterweight and said pad assembly is in the range of about 10 pounds to about 18 pounds.

2. The invention as claimed in claim 1, in which the rotational speed of said motor, and the constructions and masses and mounting points of said counterweight and said pad assembly, are such that the net centrifugal force generated by said counterweight and said pad assembly is about 14 pounds.

3. The invention as claimed in claim 1, in which the overall weight of said polisher is about 5 pounds.

4. The invention as claimed in claim 1, in which said motor has a rotational speed of about 2,400 rpm when said counterweight and said pad assembly are mounted thereon.

5. The invention as claimed in claim 1, in which the axis of rotation of said pad assembly is spaced, from the axis of said motor shaft, a distance in the range of about ⅛ inch to about ½ inch.

6. The invention as claimed in claim 5, in which said spacing is about 0.337 inch.

7. The invention as claimed in claim 1, in which the overall weight of said polisher is about 5 pounds, in which the rotational speed of said motor is about 2,400 rpm when said counterweight and said pad assembly are mounted thereon, in which the spacing between the axis of rotation of said pad assembly and the axis of said motor shaft is about ⅓ inch, and in which said net centrifugal force generated by said counterweight and said pad assembly is about 14 pounds.

8. The invention as claimed in claim 7, in which said motor is a D.C. motor, directly coupled to said counterweight, without gearing.

9. The invention as claimed in claim 1, in which said motor is a D.C. motor, directly coupled to said counterweight, without gearing.

10. The invention as claimed in claim 9, in which means are provided to mount said counterweight in cantilevered relationship from the bottom wall of said housing, without contact with the upper wall of said housing, said means comprising a flange encircling said motor and extending upwardly from said bottom wall, said means further comprising fastener means to secure the bottom end of the housing of said motor to said bottom wall of said housing of said automobile polisher.

11. The invention as claimed in claim 10, in which a skirt element is mounted on the underside of said housing of said automobile polisher, in such relationship as to prevent the operator from contacting said counterweight, and in which said skirt element is connected to said polisher housing by fastener means that also secure the bottom end of the housing of said motor to said bottom wall of said housing of said automobile polisher.

12. The invention as claimed in claim 1, in which said pad assembly has pad means the outer diameter of which is in the range of about 7 inches to about 10 inches.

13. The invention as claimed in claim 12, in which the weight of said pad assembly is about ½ pound.

14. The invention as claimed in claim 12, in which said pad assembly has a disc-shaped pad base formed of synthetic resin, and in which said pad base is secured to the upper surface of a disc-shaped pad formed of blown synthetic resin, said pad not having any recess in the upper or lower portion thereof.

15. The invention as claimed in claim 1, in which the weight of said counterweight is about ⅓ pound.

16. A hand-held orbital automobile polisher, which comprises:
a housing having handle means close-coupled thereto whereby the operator grasps the polisher closely adjacent the housing, and moves the polisher to the desired regions of the automobile or other object to be polished,
an electric motor mounted in said housing,
a counterweight mounted on the shaft of said motor, and
a pad assembly rotatably connected to said counterweight at a point offset from said motor shaft,
the axis of rotation of said pad assembly relative to said counterweight being substantially parallel to the axis of said motor shaft,
characterized in that the overall weight of said polisher is in the range of about four pounds to about eight pounds, and further characterized in that the rotational speed of said motor, and the construction and mass and mounting point of said counterweight, are such that the centrifugal force generated by said counterweight is in the range of about 35 pounds to about 43 pounds.

17. The invention as claimed in claim 16, in which the rotational speed of said motor, and the constructions and masses and mounting points of said counterweight and said pad assembly, are such that the centrifugal force generated by said counterweight and said pad assembly is about 39 pounds.

18. The invention as claimed in claim 16, in which the overall weight of said polisher is about 5 pounds.

19. The invention as claimed in claim 16, in which said motor has a rotational speed of about 2,400 rpm when said counterweight and said pad assembly are mounted thereon.

20. The invention as claimed in claim 16, in which the axis of rotation of said pad assembly is spaced, from the axis of said motor shaft, a distance in the range of about ⅓ inch to about ½ inch.

21. The invention as claimed in claim 20, in which said spacing is about 0.337 inch.

22. The invention as claimed in claim 16, in which the overall weight of said polisher is about 5 pounds, in which the rotational speed of said motor is about 2,400 rpm when said counterweight and said pad assembly are mounted thereon, in which the spacing between the axis of rotation of said pad assembly and the axis of said motor shaft is about ⅓ inch, and in which the centrifugal force generated by said counterweight is about 39 pounds.

23. The invention as claimed in claim 22, in which said motor is a D.C. motor, directly coupled to said counterweight, without gearing.

24. The invention as claimed in claim 16, in which said motor is a D.C. motor, directly coupled to said counterweight, without gearing.

25. The invention as claimed in claim 16, in which said pad assembly has pad means the outer diameter of which is in the range of about 7 inches to about 10 inches.

26. The invention as claimed in claim 25, in which the weight of said pad assembly is about ½ pound.

27. The invention as claimed in claim 16, in which the weight of said counterweight is about ⅓ pound.

28. The invention as claimed in claim 16, in which the weight of said pad assembly is about ½ pound.

29. A hand-held orbital automobile polisher, which comprises:
a housing having handle means close-coupled thereto whereby the operator grasps the polisher closely adjacent the housing, and moves the polisher to the desired regions of the automobile or other object to be polished,
an electric motor mounted in said housing,
a counterweight mounted on the shaft of said motor,
said counterweight having a first portion weighing about 0.1377 pound, the center of mass of said first portion being about 0.1125 foot from the axis of the shaft of said motor on one side of such axis,
said counterweight having a second portion weighing about 0.0614 pound, the center of mass of said second portion being about 0.0733 foot from the axis of said motor shaft on said one side thereof,
said counterweight having a third portion weighing about 0.0566 pound, the center of mass of said third portion being about 0.0533 foot from said motor axis on said one side thereof,
said counterweight having a fourth portion weighing about 0.0395 pound, said fourth portion having a center of mass approximately 0.0233 foot from said motor axis on said one side thereof,
said counterweight having a fifth portion weighing about 0.0154 pound, the center of mass of said fifth portion being approximately 0.01417 foot from the axis of said motor on the other side thereof, said counterweight having a sixth portion weighing about 0.0250 pound, the center of mass of said sixth portion being about 0.0592 foot from said motor axis on said other side thereof, said counterweight having a seventh portion weighing about 0.0245 pound, the center of mass of said seventh portion being about 0.0983 foot from said motor axis on said other side thereof, and a pad assembly rotatably connected to said counterweight at a point offset from said motor shaft, the axis of rotation of said pad assembly relative to said counterweight being substantially parallel to the axis of said motor shaft, the overall weight of said polisher being in the range of about four pounds to about eight pounds.

30. The invention as claimed in claim 29, in which said first and second portions of said counterweight are relatively close to said pad assembly, in which said third portion of said counterweight extends towards said motor from said first and second portions, in which said fourth, fifth and sixth portions of said counterweight are generally coplanar and are relatively close to said motor, and in which said seventh counterweight portion extends downwardly toward said pad assembly.

31. The invention as claimed in claim 30, in which said seven counterweight portions lie, respectively, between planes which are (a) parallel to each other, and (b) perpendicular to a reference plane containing the axis of the shaft of said motor and also the axis of rotation of said pad assembly.

32. The invention as claimed in claim 31, in which said first portion is generally rectangular and has its major axis perpendicular to said reference plane, said first portion being relatively thick and having its lower surface relatively close to the pad portion of said pad assembly, in which said first through fourth portions of said counterweight, when viewed from above, appear to form a single rectangle between two of said planes one of which is the farthest from the axis of said motor and one of which passes through said motor axis, and in which said fifth counterweight portion is trapezoidal when viewed from above as is the adjacent region of said sixth counterweight portion, the base of the trapezoid being relatively short compared to the distance between the sides of said first through fourth counterweight portions.

33. The invention as claimed in claim 32, the overall weight of said polisher is about 5 pounds, in which the speed of rotation of said motor when said counterweight and pad assembly are connected thereto is about 2,400 rpm, in which said pad assembly weighs about ½ pound and has pad portions about 9 inches in diameter, and in which the distance between the axis of rotation of said pad assembly and the axis of the shaft of said motor is about ⅓ inch.

* * * * *